United States Patent
Kotera

(10) Patent No.: US 9,701,017 B2
(45) Date of Patent: Jul. 11, 2017

(54) PROCESS APPLICATION ROBOT SYSTEM HAVING FUNCTION FOR MANAGING PROCESS CONDITION

(71) Applicant: FANUC Corporation, Yamanashi (JP)

(72) Inventor: Shun Kotera, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 295 days.

(21) Appl. No.: 14/667,301

(22) Filed: Mar. 24, 2015

(65) Prior Publication Data

US 2015/0273690 A1 Oct. 1, 2015

(30) Foreign Application Priority Data

Mar. 27, 2014 (JP) .................................. 2014-066635

(51) Int. Cl.
*B25J 9/00* (2006.01)
*B25J 9/16* (2006.01)

(52) U.S. Cl.
CPC ... *B25J 9/1656* (2013.01); *G05B 2219/35472* (2013.01); *G05B 2219/36542* (2013.01); *Y10S 901/03* (2013.01)

(58) Field of Classification Search
None
See application file for complete search history.

(56) References Cited

U.S. PATENT DOCUMENTS

| 4,679,137 A | 7/1987 | Lane et al. | |
| 6,107,601 A * | 8/2000 | Shimogama | B23K 9/1037 219/130.01 |
| 6,434,448 B1 * | 8/2002 | Kosaka | B25J 9/1674 318/568.11 |
| 2003/0033052 A1 * | 2/2003 | Hillen | G05B 19/042 700/212 |
| 2004/0193320 A1 * | 9/2004 | Watanabe | B25J 9/1664 700/245 |

(Continued)

FOREIGN PATENT DOCUMENTS

| CN | 1756616 A | 4/2006 |
| CN | 102225484 A | 10/2011 |

(Continued)

*Primary Examiner* — Christopher E Everett
(74) *Attorney, Agent, or Firm* — Hauptman Ham, LLP

(57) ABSTRACT

A process application robot system in which a process condition can be adjusted even when operation limitation regarding setting the condition is valid, while ensuring safety regarding management and operation of the process condition. The robot system includes a robot which carries out a predetermined process operation; a robot controller which controls the robot; a process controller which controls a processing treatment in the process operation; an interface part for setting, changing or adjusting a process condition which determines a content of the process treatment; and a process condition change managing part which carries out an operation limitation with respect to setting of or setting change in the process condition. The content of the process condition which is set when the operation limitation is invalid is determined as a reference condition, and the process condition can be adjusted within an adjustable range based on the reference condition.

6 Claims, 2 Drawing Sheets

(56) References Cited

U.S. PATENT DOCUMENTS

| | | | |
|---|---|---|---|
| 2006/0106471 A1* | 5/2006 | Ikeda | B25J 13/06 700/83 |
| 2006/0287769 A1* | 12/2006 | Yanagita | B25J 9/1669 700/245 |
| 2007/0000891 A1 | 1/2007 | Ikeda et al. | |
| 2013/0200053 A1* | 8/2013 | Bordatchev | B23K 26/04 219/121.78 |

FOREIGN PATENT DOCUMENTS

| | | |
|---|---|---|
| JP | 9-44227 A | 2/1997 |
| JP | 2004-223555 A | 8/2004 |
| JP | 2004-299013 A | 10/2004 |
| JP | 2005-103740 A | 4/2005 |
| JP | 2005-148803 A | 6/2005 |
| JP | 2005-193338 A | 7/2005 |
| JP | 2007-115011 A | 5/2007 |
| JP | 2007-160350 A | 6/2007 |
| JP | 2007-210007 A | 8/2007 |
| JP | 2008-221363 A | 9/2008 |
| JP | 2012-146109 A | 8/2012 |
| WO | 2012/157157 A1 | 11/2012 |

\* cited by examiner

PROCESS APPLICATION ROBOT SYSTEM HAVING FUNCTION FOR MANAGING PROCESS CONDITION

RELATED APPLICATIONS

The present application claims priority to Japanese Application Number 2014-066635, filed Mar. 27, 2014, the disclosure of which is hereby incorporated by reference herein in its entirety.

BACKGROUND OF THE INVENTION

1. Field of the Invention

The preset invention relates to a process application robot system having a function for managing a process condition.

2. Description of the Related Art

In a processing-use robot system (or a process application robot system) of the prior art, a plurality of operation modes may be managed, wherein the modes are switched by means of a switch, etc., provided to a process controller or a robot controller, or the modes are switched by an operator using a password login function of software of the controller. For example, in a lower level operation mode or under predetermined conditions, a change in important settings having an affect on welding quality may be limited, whereby a trouble, such as an incorrect setting or a change in setting unrecognized or unintended by a user in an upper level or a system manager, can be prevented. Therefore, the system can be safely managed and operated.

As relevant prior art documents, JP 2007-210007 A discloses a technique in which an operation regarding a welding power source is limited, corresponding to respective lock modes selected by a key switch of the welding power source.

Further, WO 2012/157157 A1 discloses a technique in which whether or not welding conditions can be changed is determined, depending on a connection stated between a welding condition setter and a welding power source, and on contents of a change-permission setting of the welding power source.

In a conventional process application robot system, first, in an upper level operation mode in which there is no (or few) operation limitation, a process program is generated or taught, and a process condition is set. Then, after the robot system is started up and brought to a production stage, the robot system is operated in a lower level operation mode in which minimal operations, such as starting and stopping the process program, etc., can be carried out. By virtue of this, the process application system at the production stage can be protected from incorrect setting or a change in setting unrecognized or unintended by a system manager, by which processing quality may be affected.

In fact, the position and orientation in teaching and the process condition are often to be fine-tuned after the production stage. The reason thereof varies depending on the application such as arc welding or spot welding. For example, in the arc welding, a target position may be varied due to a placement error or a dimension error or an object to be welded, and an amount of heat input of the object or a jig may be varied due to continuous welding during the production stage. Therefore, it is desired that stable process conditions be constituted while taking into consideration various external factors after the production stage.

On the other hand, even when the present process conditions do not include any problem, there may be a situation where the process state should be checked when a command current is slightly increased or decreased. When such a situation occurs, the operator must switch the operation mode to the upper level, whereby the operability is lowered. In particular, when the robot controller and the process controller are located away from a production site by a considerable distance, it is cumbersome for the operator to move from the production site to the controller in order to switch the operation mode.

SUMMARY OF THE INVENTION

Therefore, an object of the present invention is to provide a process application robot system in which the process condition can be adjusted even in the lower level operation mode, while ensuring safety regarding management and operation of the process condition.

According to the present invention, there is provided a process application robot system comprising: a robot which carries out a predetermined process operation with respect to an object to be processed; a robot controlling part which controls a motion of the robot; a process controlling part which controls a processing treatment in the process operation carried out by the robot; an interface part for setting, changing or adjusting a process condition which determines a content of the process treatment commanded by the process controlling part; and a process condition change managing part which carries out an operation limitation with respect to setting of or setting change in the process condition, based on a predetermined judgment condition, wherein the process condition, which is set when the operation limitation by the process condition change managing part is invalid, is applied to the system as a reference condition, and wherein, when the operation limitation by the process condition change managing part is valid, the process condition can be adjusted within an adjustable range based on the reference condition.

In a preferred embodiment, the process condition, which is changed when the operation limitation by the process condition change managing part is valid, can be applied to the system as a new reference condition when the operation limitation by the process condition change managing part is invalid, and a changed content of the process condition can be discarded so that the changed reference condition is replaced with the previous reference condition.

In a preferred embodiment, the adjustable range is set when the operation limitation by the process condition change managing part is invalid.

In a preferred embodiment, the interface part is configured to highlight the process condition which is changed when the operation limitation by the process condition change managing part is valid.

In a preferred embodiment, the process condition change managing part carries out the operation limitation with respect to setting of or setting change in the process condition, by switching a plurality of operation modes including an upper level operation mode in which the process condition can be set and a lower level operation mode in which the operation limitation with respect to setting of or setting change in the process condition is valid.

In a preferred embodiment, the process condition change managing part carries out the operation limitation with respect to setting of or setting change in the process condition, with respect to each of a plurality of preset operator levels or with respect to each a plurality of operators, passwords of which are managed.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
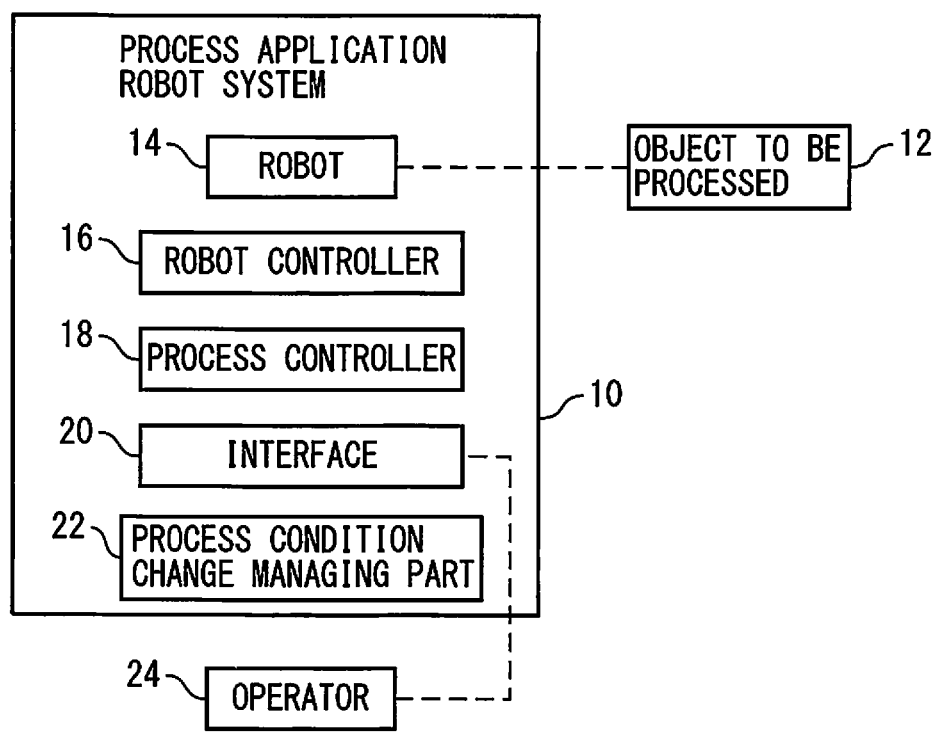
FIG. 1 is a functional block diagram showing a basic configuration of a process application robot system according to the present invention.

FIG. 1 is a functional block diagram of a process application robot system (hereinafter, also referred to as merely a robot system) 10 according to a preferred embodiment of the present invention. Robot system 10 includes a robot 14 which carries out a predetermined process operation with respect to an object or workpiece 12 to be processed; a robot controller (or a robot controlling part) 16 which controls a motion of robot 14; a process controller (or a process controlling part) 18 which controls a processing treatment in the process operation carried out by robot 14; an interface part 20 for setting, changing or adjusting a process condition (or a process schedule) which determines a content of the process treatment commanded by process controller 18, based on operation by an operator 24, etc.; and a process condition change managing part 22 which carries out an operation limitation with respect to setting of or setting change in the process condition, based on a predetermined judgment condition. In FIG. 1, robot controller 16 and process controller 18 are describes as separate devices. However, a robot system wherein the controllers are integrated may be included in the scope of the present invention.

Herein, the term "process (processing)" refers to making some alterations by using a robot so as to manufacture a new article. Concretely, the process includes all of operations, such as welding, machining, laser-processing and painting, etc., capable of being applied to the process application robot system. In this regard, robot controller 16 controls the position and orientation of the robot. For example, robot controller controls the motion of the robot for moving a work tool (not shown), such as a welding torch or a spray gun attached to a front end of an arm of robot 14, toward workpiece 12.

On the other hand, process controller 18 controls, for example, a welding power source connected to the welding torch or a paint supply source connected to the spray gun. More concretely, process controller 18 controls an output (current and voltage, etc.) of the welding power source or an output (the pressure and flow rate, etc.) of the paint supply source.

Therefore, the term "process condition" herein does not include a condition regarding the motion control (or the control of the position and orientation) of the robot. In addition, as a concrete example of interface 20, a teaching operation panel provided to robot controller 16 or process controller 18 may be used.

Figure 2:
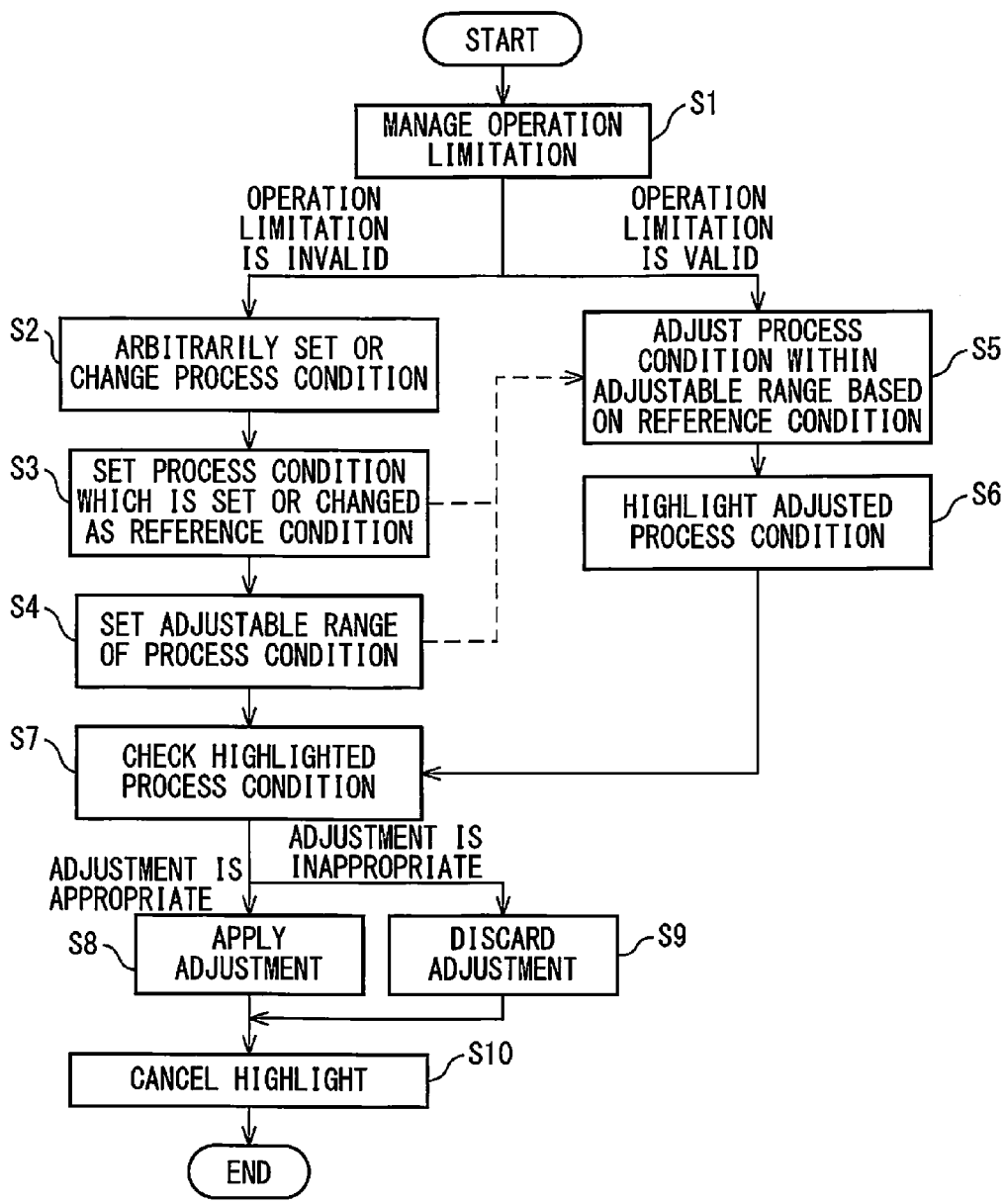
FIG. 2 is a flowchart showing an example of a procedure in the robot system of FIG. 1.

FIG. 2 is a flowchart showing an example of a procedure in the robot system of FIG. 1. First, in step S1, process condition change managing part 22 manages the operation limitation with respect to setting of or setting change in the process condition in the robot system. For example, when a plurality of operation modes are set in the robot system, process condition change managing part 22 may invalidate the operation limitation in an upper level operation mode of the operation modes (i.e., the process condition may be arbitrarily set or changed), and may validate the operation limitation in a lower level operation mode of the operation modes (i.e., the operation for setting or changing the process condition is limited).

Switching of the operation mode (valid/invalid of the operation limitation) can be carried out depending on various judgment conditions. For example, the operation mode may be switched by means of a switch provided to robot controller 16 or process controller 18. Even when the operation mode or the switch is not provided to the robot system, the function of process condition change managing part 22 can be controlled by software control using interface part 20. For example, the operation limitation with respect to setting of or setting change in the process condition may be determined corresponding to an operator level (e.g., a level having an authority for arbitrarily carrying out all of settings; a level having an authority for carrying out a setting regarding the processing; or a level having an authority for initiating the program only) which is predetermined with respect to each of a plurality of operators. Otherwise, the operator levels may be automatically distributed to respective operators, passwords of which are managed. Normally, an administrator of robot system 10 or an expert who initiates or sets the process application robot system may operate the robot system when the operation limitation with respect to setting of or setting change in the process condition is invalid. On the other hand, an operator who can carry out basic operations only, such as initiating or stopping the process program, may operate the robot system when the operation limitation with respect to setting of or setting change in the process condition is valid.

Herein, in the term "upper level operation mode," an operator having a certain degree of (usually, unlimited) authority for setting the process condition, such as an administrator or an expert, can work. In other words, the upper level operation mode has more degrees of freedom regarding the operation (or less limitations regarding setting the process condition) than the lower level operation mode. On the other hand, in the term "lower level operation mode," a rank-and-file operator or a non-expert, having a limited setting authority relative to the administrator or expert, can work. In other words, the lower level operation mode has some limitations relative to the upper level operation mode. In addition, operator 24 as shown in FIG. 1 may be any kind of operator described above. Therefore, the operation by means of interface part 20 may be carried out in both the upper and lower level operation modes.

When the operation limitation with respect to setting of or setting change in the process condition is set invalid in step S1, the process condition may be arbitrarily set or changed in step S2. In this regard, the process condition, which is set or changed, is applied to the system as a reference condition (or a reference schedule), based on which an adjustable range of the process condition is determined (step S3). The reference condition is stored in the system, separately from the process condition. Usually, the robot system may set or store a plurality of process conditions in order to carry out various kinds of processing. For example, a first condition is to process a component "A," and a second condition is to process a component "B" different from component "A." Usually, it is necessary to prepare the same number of reference conditions as the process conditions which are set in the system, and the reference conditions are respectively set and stored for the process conditions. Further, when the process condition is set or changed, the set or changed content may be automatically copied to the reference condition corresponding to the set or changed process condition, otherwise, the reference condition may be manually set or changed separately from the process condition.

In the next step S4, a process condition adjustable range (or an adjustable range of the process condition) (as described below) is set when the operation limitation with respect to setting of or setting change in the process condition is valid. Otherwise, the adjustable range of the process condition may be previously set.

On the other hand, when the operation limitation with respect to setting of or setting change in the process condition is set valid in step S1, the process condition can be adjusted only within the adjustable range based on the reference condition (step S5). In this regard, the adjustable range is to inhibit a change in the process condition by which the processing quality is significantly affected, when the operation limitation with respect to setting of or setting change in the process condition is valid. In other words, the processing quality is not significantly changed when the process condition is changed within the adjustable range. For example, the adjustable range may be set so that only fine adjustment of the process condition can be carried out. Otherwise, when the robot system is configured for arc-welding, in the process condition including a plurality of commands regarding current and voltage, etc., the adjustment of the current may be inhibited, while the adjustment of the voltage may be allowed within a fine-adjustable range. The process condition adjustable range may be arbitrarily set when the operation limitation with respect to setting of or setting change in the process condition is invalid.

In addition, even when the process condition is adjusted in step S5, the reference condition is not changed, whereby the adjustable range of the process condition is not changed. Further, although it is described that the reference condition is stored separately from the process condition, the reference condition may not be stored. In this case, the process condition which is set in step S3 is determined as the reference condition, i.e., the reference condition is identical to the process condition. Therefore, the reference condition is also changed by adjusting the process condition in step S5, and the process condition before being adjusted (i.e., the reference condition) can be calculated by storing an amount of change due to the adjustment in step S5 in the robot system.

The process condition, which is adjusted when the operation limitation with respect to setting of or setting change in the process condition is valid, may be highlighted by means of interface part 20, etc. For example, the adjusted process condition may be displayed or highlighted in red, or by black/white reversal (step S6). Instead of or in addition to the visual means such as the highlighting, an auditory means, configured to output an alarm when the process condition is adjusted, may be used.

The highlighting as described above may also be similarly carried out when the operation limitation with respect to setting of or setting change in the process condition is invalid, and therefore the process condition adjusted when the operation limitation is valid can be easily monitored (step S7). In this case, interface part 20 can display not only the adjusted process condition, but also the process condition before being adjusted (i.e., the reference condition). By virtue of this, the operator can easily recognize as to how adjustment has been carried out, and can judge as to whether the adjustment is appropriate or not. This judgment may be carried out based on the processing quality of the workpiece which is actually processed under the adjusted process condition, or based on experiment by the administrator or the expert. As an example of the latter case, in case robot system 10 is configured for arc-welding and, only the current (not the voltage) is adjusted as the process condition when the operation limitation with respect to setting of or setting change in the process condition is valid, it is usually necessary to readjust the voltage when the current is changed in the arc-welding. Therefore, even when the adjusted current is within the adjustable range, it may be judged that the adjustment of the current is inappropriate.

In case it is judged that the adjustment of the process condition, carried out when the operation limitation with respect to setting of or setting change in the process condition is valid, is appropriate, process condition change managing part 22 may apply the adjusted process condition to the system and set the adjusted process condition as a new reference condition when the operation limitation with respect to setting of or setting change in the process condition is invalid (step S8). On the other hand, in case it is judged that the adjustment of the process condition, carried out when the operation limitation with respect to setting of or setting change in the process condition is valid, is inappropriate, process condition change managing part 22 may discard the adjustment and replace the adjusted process condition with the previous process condition when the operation limitation with respect to setting of or setting change in the process condition is invalid (step S9).

Finally, in step S10, the highlighting is canceled so that the displaying state is returned to the previous state, and the series of the procedure is terminated.

The process application robot system of the present invention is not limited to the system as shown in FIG. 1. For example, a plurality of robots may be operated with respect to the workpiece, and/or peripheral equipment other than the robot may be incorporated in the system. Further, the robot controller and the process controller may be integrated as substantially one controller. Such configurations are included in the scope of the present invention.

According to the present invention, the process condition can be adjusted even when the operation limitation with respect to setting of or setting change in the process condition is valid. Therefore, it is not necessary for the operator to carry out switching of the operation limitation, whereby the operability of the system can be improved. Further, the adjustment of the process condition when the operation limitation is valid is limited within the adjustable range based on the reference condition, whereby management and operation of the process condition may be safely carried out.

The process condition, which is adjusted when the operation limitation with respect to setting of or setting change in the process condition is valid, may be applied to the system as a new reference condition when the operation limitation is invalid, and further, the changed content may be discarded so as to restore the previous process condition, whereby management and operation of the process condition may be safely carried out. In addition, the process condition adjustable range, which is applied to the system when the operation limitation with respect to setting of or setting change in the process condition is valid, may be set when the operation limitation is invalid, whereby management and operation of the process condition may be safely carried out.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A process application robot system comprising:
a robot which carries out a predetermined process operation with respect to an object to be processed;
a robot controlling part which controls a motion of the robot;
a process controlling part which controls a processing treatment in the process operation carried out by the robot;
an interface part for setting, changing or adjusting a process condition which determines a content of the process treatment commanded by the process controlling part, wherein the process condition does not include a condition regarding the motion control of the robot; and
a process condition change managing part which carries out an operation limitation with respect to setting of or setting change in the process condition, based on a predetermined judgment condition,
wherein the process condition, which is set when the operation limitation by the process condition change managing part is invalid, is applied to the system as a reference condition, and wherein, when the operation limitation by the process condition change managing part is valid, the process condition can be adjusted within an adjustable range based on the reference condition.

2. The process application robot system as set forth in claim 1, wherein the process condition, which is changed when the operation limitation by the process condition change managing part is valid, can be applied to the system as a new reference condition when the operation limitation by the process condition change managing part is invalid, and wherein a changed content of the process condition can be discarded so that the changed reference condition is replaced with the previous reference condition.

3. The process application robot system as set forth in claim 1, wherein the adjustable range is set when the operation limitation by the process condition change managing part is invalid.

4. The process application robot system as set forth in claim 1, wherein the interface part is configured to highlight the process condition which is changed when the operation limitation by the process condition change managing part is valid.

5. The process application robot system as set forth in claim 1, wherein the process condition change managing part carries out the operation limitation with respect to setting of or setting change in the process condition, by switching a plurality of operation modes including an upper level operation mode in which the process condition can be set and a lower level operation mode in which the operation limitation with respect to setting of or setting change in the process condition is valid.

6. The process application robot system as set forth in claim 1, wherein the process condition change managing part carries out the operation limitation with respect to setting of or setting change in the process condition, with respect to each of a plurality of preset operator levels or with respect to each a plurality of operators, passwords of which are managed.

* * * * *